United States Patent
Spillane et al.

(10) Patent No.: US 10,814,440 B1
(45) Date of Patent: Oct. 27, 2020

(54) METHOD OF ASSEMBLING AN AUTOMATED MODULAR TOOL

(71) Applicant: AUTOMATION SERVICES L.L.C, Bloomfield Hills, MI (US)

(72) Inventors: Alex F. Spillane, Clarkston, MI (US); Rodney Dwain Phillips, Pontiac, MI (US); Michael Fuller Frank, Pontiac, MI (US)

(73) Assignee: AUTOMATION SERVICES, L.L.C., Bloomfield Hills, MI (US)

( * ) Notice: Subject to any disclaimer, the term of this patent is extended or adjusted under 35 U.S.C. 154(b) by 78 days.

(21) Appl. No.: 15/995,364

(22) Filed: Jun. 1, 2018

(51) Int. Cl.
| | | |
|---|---|---|
| B23P 19/04 | (2006.01) | |
| B25J 18/02 | (2006.01) | |
| B25J 17/02 | (2006.01) | |
| B23P 11/00 | (2006.01) | |
| B25J 9/02 | (2006.01) | |
| B25J 15/04 | (2006.01) | |
| B23Q 3/157 | (2006.01) | |
| B25H 1/00 | (2006.01) | |

(52) U.S. Cl.
CPC .......... *B23P 19/04* (2013.01); *B25J 17/0258* (2013.01); *B25J 18/02* (2013.01); *B23P 11/00* (2013.01); *B23Q 3/15706* (2013.01); *B25H 1/0078* (2013.01); *B25J 9/026* (2013.01); *B25J 15/0491* (2013.01); *Y10S 483/901* (2013.01); *Y10S 901/16* (2013.01); *Y10S 901/41* (2013.01); *Y10T 483/1795* (2015.01)

(58) Field of Classification Search
CPC .. B23P 19/04; B23P 11/00; B25J 18/02; B25J 17/0258; B25J 15/04–0491; B25J 9/02–026; B25H 1/0078; B23Q 3/15706; Y10T 483/1795; Y10T 483/179–1798; Y10S 901/16; Y10S 901/41; Y10S 483/901

See application file for complete search history.

(56) References Cited

U.S. PATENT DOCUMENTS

| | | | |
|---|---|---|---|
| 6,416,273 B1 * | 7/2002 | Herbermann | B21D 43/055 414/749.1 |
| 6,823,604 B2 * | 11/2004 | Kato | B23Q 11/0003 33/549 |
| 7,748,107 B2 | 7/2010 | Hurst et al. | |
| 8,077,963 B2 * | 12/2011 | Wang | B25J 5/007 382/153 |
| 8,944,423 B2 * | 2/2015 | Marrinan | B23Q 1/035 269/21 |
| 9,533,384 B1 | 1/2017 | McCallum et al. | |

* cited by examiner

*Primary Examiner* — Sarang Afzali
(74) *Attorney, Agent, or Firm* — Brooks Kushman P.C.

(57) ABSTRACT

A method and apparatus are disclosed for assembling an end effector for an automated modular tool. A processor is programmed with data corresponding to a portion of a part surface at a designated location. A setting fixture is driven with a plurality of linear motion actuators to a selected three-dimensional location relative to an adaptor bar of the modular tool that is attached to a frame. A tool setting head is rotated with a rotary drive. A platen is tilted with at least one platen tilting motor and gear set to angularly orient the platen to correspond to an angular orientation of the portion of the part surface at the designated location. An end effector is then placed on the platen and secured with a tooling arm to the adaptor bar.

8 Claims, 10 Drawing Sheets

METHOD OF ASSEMBLING AN AUTOMATED MODULAR TOOL

TECHNICAL FIELD

This disclosure relates to a method and apparatus for setting the location of modular automation tooling.

BACKGROUND

Automation fixtures may be provided with modular automation tooling that is used to move parts through a manufacturing process. Manufacturing processes may include sheet metal presses, welding assembly lines, machining lines, glass forming and tempering lines, plastic molding processes, and other manufacturing processes where parts are loaded and unloaded with automation tooling into tools performing manufacturing operations.

Automation tooling may be provided with rails that are adapted to receive adjustable arms and end effectors such as vacuum cups, mechanical gripping devices, clamps, and part presence sensors. The rails and arms include vacuum supply lines, compressed air lines, and electrical cables that provide vacuum, compressed air, and electrical connections to the end effectors depending upon the requirements of the automation tooling.

Modular automation tooling is designed to be changed over periodically to accommodate multiple parts types that are processed through a manufacturing line. The position of the end effector may be required to be changed when a different part shape must be engaged by an end effector. The location of the end effectors must be precisely set and locked into place. The location of end effectors may be set on the production line by stopping the line and moving the arms and end effectors to engage the part at a pick-up location. Setting the position of the automation tooling on the line is not favored because of interference with production.

Automation tooling is preferably set up offline or at a remote location based upon the position and shape of a sample part. One problem with offline set up for automation tooling is that the sample part must be transported to the remote location. Transporting a sample part is time consuming and increases costs. Problems may also be encountered in obtaining a pre-production part when a new part is being developed due to a lack of availability of the part and the need to readjust the position of end effectors to accommodate part modifications.

Computer aided design (CAD) data may be used to set up automation tooling by manually manipulating and positioning a mechanical gauge on a table. The mechanical gauge is positioned on the table at an X-Y location and is adjusted in the Z direction. A tool mount is positioned rotationally to correspond to the planar orientation of the part surface orientation based upon the CAD data. This approach is time-consuming and is subject to human error that may occur in the course of positioning and setting the gauge configuration.

This disclosure is directed to solving the above problems and other problems as summarized below.

SUMMARY

According to one aspect of this disclosure, a method is disclosed for assembling an automated modular tool. The method includes the steps of programming a processor with data corresponding to a portion of a part surface at a designated location. A setting fixture is driven with a plurality of linear motion actuators to a selected three-dimensional location relative to an adaptor bar attached to a frame. A tool setting head of the setting fixture is rotated with a head rotation motor. A platen is pivoted with a platen tilting motor and a set to angularly orient the platen to correspond to an angular orientation of the portion of the part surface at the designated location. An end effector is placed on the platen and is secured with a tooling arm to the adaptor bar.

According to other aspects of the method, the step of driving the setting fixture may further comprise moving a rail in an X direction with an X axis linear actuator on a pair of spaced parallel tracks, and moving the setting fixture in a Y direction with a Y axis linear actuator along a length of the rail to a selected X-Y location based upon the data. The X axis linear actuator and Y axis linear actuator may both be rack and pinion gear sets. The step of driving the setting fixture may further comprise moving the setting fixture in a Z direction with a Z axis linear actuator to a selected Z location based upon the data. The Z axis linear actuator may be a worm gear and a worm gear drive.

The step of rotating the tool setting head may further comprise rotating the tool setting head within a range of at least 180 degrees about a Z axis extending through the platen.

The step of pivoting the platen may be performed with the at least one platen tilting motor driving a first pinion gear and a first arcuate gear, and a second platen tilting motor driving a second pinion gear and a second arcuate gear oriented perpendicular to the first arcuate gear.

The method may further comprise providing the platen with visible indicia corresponding to a shape of an end effector or to a point location, and locating the end effector in alignment with the visible indicia.

According to another aspect of this disclosure, an apparatus is disclosed for setting a position of an end effector of an automated modular tool. The apparatus comprises a controller programmed with data corresponding to a portion of a surface of a part. A pair of parallel tracks is attached to the frame and a rail is assembled between the tracks. An X axis linear actuator is operatively connected between the tracks and the rail to move the rail along an X axis. A mast is assembled to the rail and a Y axis linear actuator is operatively connected between the rail and the mast for moving the mast along a Y axis. A tool setting head is assembled to the mast and a Z axis linear actuator is operatively connected between the rail and the mast for moving the mast along a Z axis. A rotary drive motor is operatively connected between the tool setting head and the mast to rotate the tool setting head about the Z axis. A platen is assembled to the tool setting head and an arcuate motion actuator is operatively connected between the tool setting head and the platen to pivot the platen about a tilt axis extending parallel to a top surface of the platen. The platen is oriented to be engaged by the end effector when the position of the end effector is set.

According to other aspects of the apparatus, the track may further comprise a right-side track and a left-side track extending in an X axis direction. One of the right-side track and the left-side track may further comprise a rack gear attached to each of the right-side track and left-side track that extend in an X axis direction, and a pinion gear is assembled to each of a right-side X axis drive motor and a left-side X axis drive motor. The drive motors rotate the pinion gears that engage the rack gears to move the rail along the X axis.

The apparatus may further comprise a rack gear attached to the rail and extending in a Y axis direction and a pinion gear assembled to a Y axis drive motor. The Y axis drive motor rotates the pinion gear that engages the rack gear to move the mast along the Y axis.

The Z axis linear actuator may further comprise a worm gear set attached to the mast and extending in a Z axis direction, and a Z axis worm drive motor. The Z axis worm drive motor rotates the worm gear set to move the mast along the Z axis.

The apparatus may further comprise a ring gear disposed between the tool setting head and the mast and a pinion gear assembled to the rotary drive for rotating the tool setting head relative to the mast.

The arcuate motion actuator may further comprise an arcuate gear disposed between the tool setting head and the platen and a pinion gear assembled to the arcuate motion actuator that engages the arcuate gear to pivot the platen.

The arcuate motion actuator may further comprise a second arcuate gear disposed perpendicular to the arcuate gear and between the tool setting head and the platen, and a second pinion gear assembled to a second arcuate drive motor that engages the second arcuate gear to pivot the platen.

The frame may further comprise an adaptor bar retainer attached to the frame that is configured to hold an adaptor bar in a fixed location. An arm of an automated modular tool may be assembled to the adaptor bar with an end effector disposed on the platen. When the end effector is on the platen, the arm and end effector may then be locked at a data defined location.

The adaptor bar retainer may be pivotably attached to the frame and fixed in several different locations. A plurality of adaptor bars may be assembled to a plurality of sides of the adaptor bar retainer and an arm of an automated modular tool may be assembled to each of the adaptor bars. The adaptor bar retainer may be pivoted on the frame to set up each of the adaptor bars.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
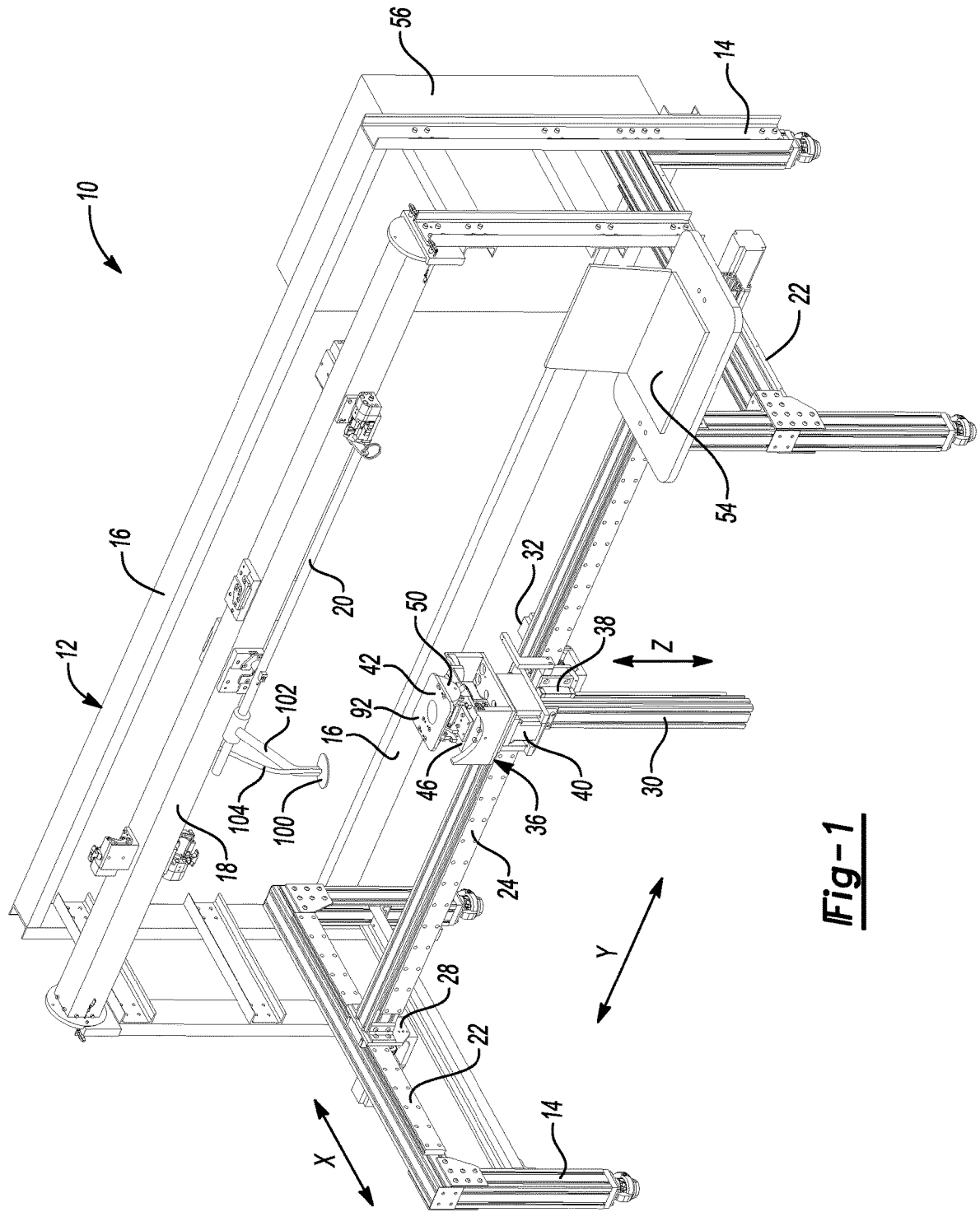
FIG. 1 is a perspective view of an apparatus for setting the position of an end effector of an automated modular tool.
Figure 2:
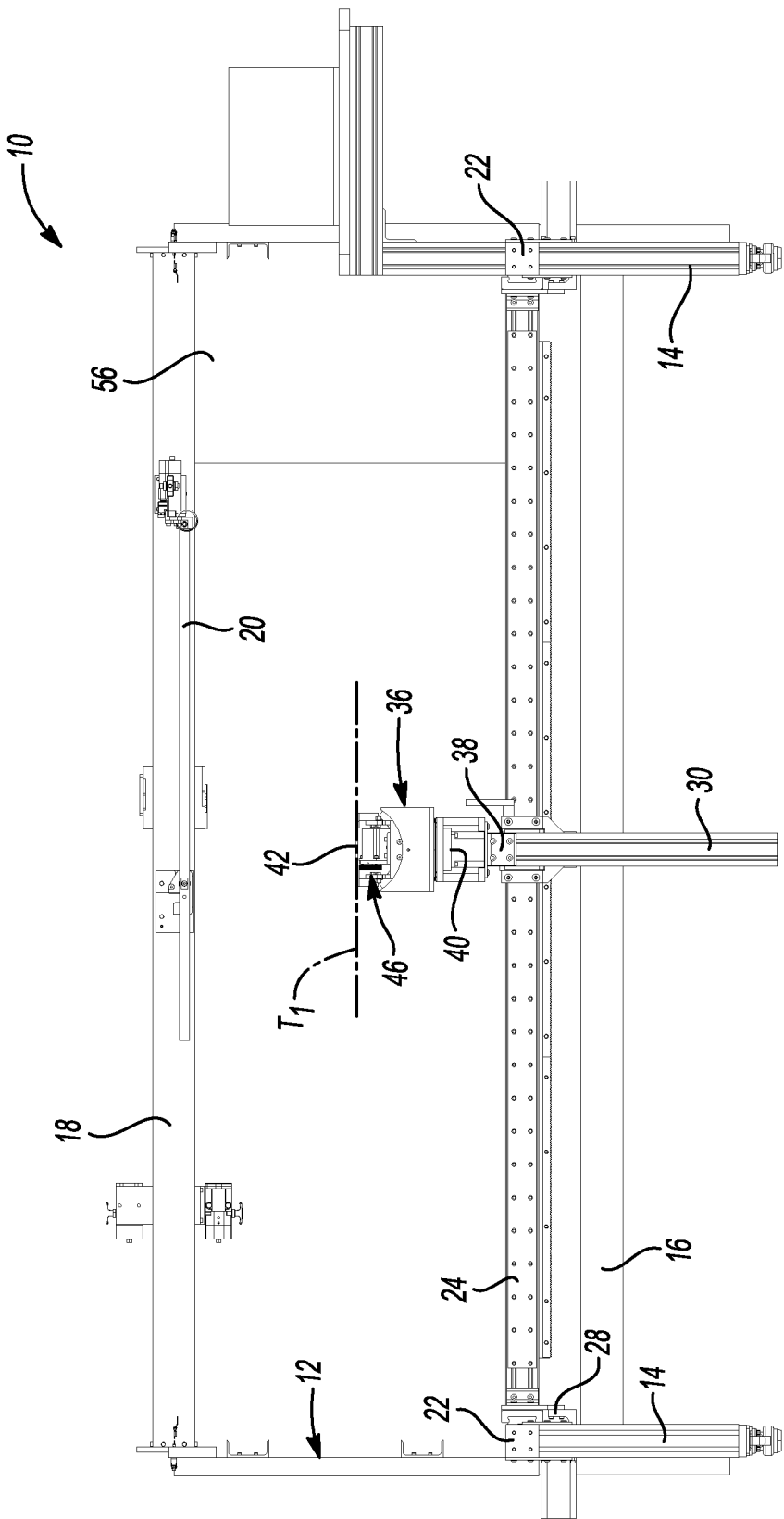
FIG. 2 is a front elevation view of the apparatus for setting the position of an end effector of an automated modular tool shown in FIG. 1.
Figure 3:
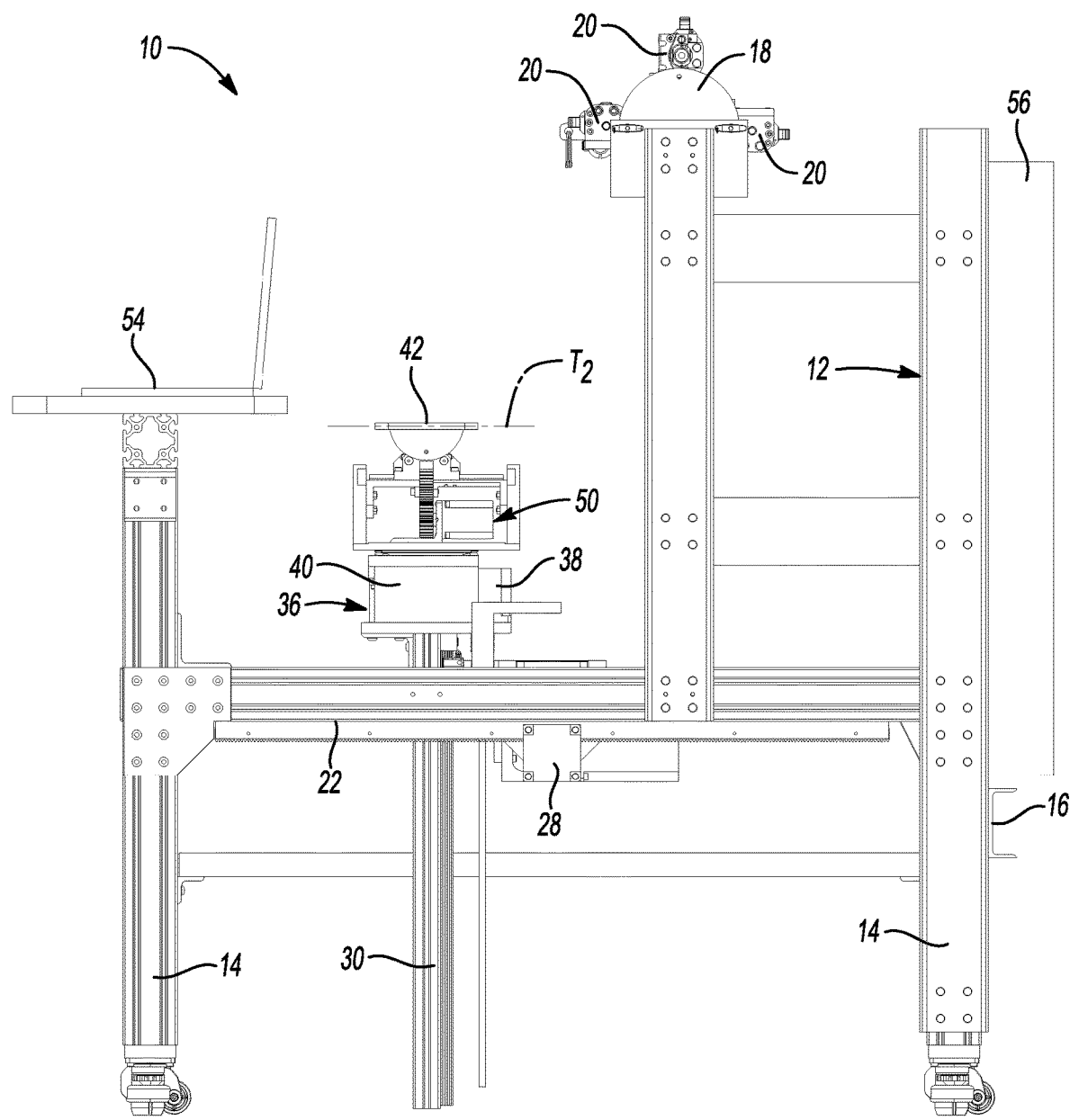
FIG. 3 is a side elevation view of the apparatus for setting the position of an end effector of an automated modular tool shown in FIG. 1.

Referring to FIGS. 1-3, an end effector positioning apparatus generally indicated by reference numeral 10 is disclosed. The end effector positioning apparatus 10 includes a frame 12 that is supported on a set of legs 14. The legs 14 are connected in a spaced relationship by crossbars 16. An adaptor bar retainer 18 holds an adaptor bar 20 in a fixed position on the frame 12.

The frame 12 supports right and left tracks 22 in a spaced relationship relative to the ground or floor. The right and left tracks 22 extend in an X direction, or along an X axis, and are spaced from and parallel to each other. A rail 24 is assembled to both tracks 22 and extends in the Y direction, or along a Y axis. The rail 24 is disposed perpendicular to the tracks 22. An X axis linear actuator 28 functions to move the rail 24 in the X direction.

A mast 30 is assembled to the rail 24 and is movable in the Y direction relative to the rail 24. The mast 30 is illustrated in FIGS. 1-3 to extend below the rail 24 and is movable in a Z direction, or along a Z axis. The mast 30 also moves in the X axis when the rail 24 is moved along the tracks 22. A tool setting head 36 is attached to an upper end of the mast 30. The mast 30 may be maintained in a lowered position with the tool setting head 36 adjacent the rail 24 to avoid contacting a tooling arm or previously positioned end effector as will be described below. Once positioned in the X and Y directions the mast 30 is raised in the Z direction to the desired height by a Z axis actuator 38.

Figure 4:
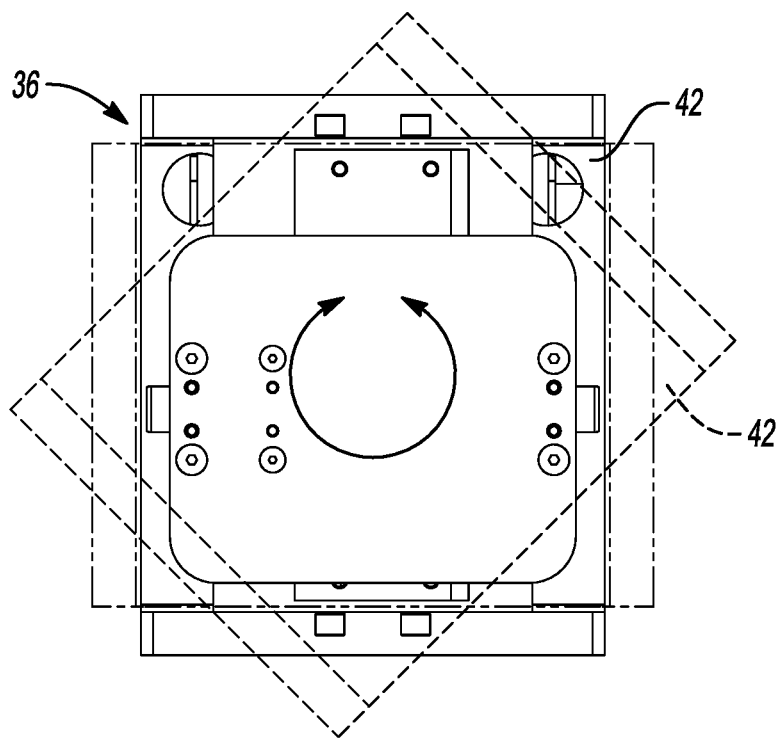
FIG. 4 is a plan view of a platen with the platen being rotated as shown in phantom lines.

Referring to FIGS. 3 and 4, a rotary drive 40 is provided between the tool setting head 36 and the mast 30 to rotate the platen 42 as indicated by the arcuate arrow in FIG. 4 to a desired orientation. The rotary drive 40 may rotate more than 180 degrees but less than 360 if two tilt mechanisms are provided. If two tilt mechanisms are provided the rotary drive 40 and tilt mechanisms may be more simply wired to the control system. Alternatively, the rotary drive 40 may be fully rotatable about 360 degrees of rotation if a single tilt mechanism is provided but care must be taken to avoid wrapping the wiring as the tool setting head is manipulated.

Referring specifically to FIG. 2, a first arcuate motion actuator 46 is shown that pivots the platen about a first tilt axis $T_1$.

Referring specifically to FIG. 3, a second arcuate motion actuator 50 is shown that pivots the platen about a second tilt axis $T_2$.

The first and second arcuate motion actuators 46 and 50 are rotated with the rotary drive 40 to permit orienting the platen 42 in a wide variety of planar positions to correspond to any desired orientation of a portion of a part surface.

Referring to FIGS. 1-3, a controller 54 communicates with the actuators through a motor control panel 56. The controller 54 may be a lap top computer as illustrated or another type of programmable controller. The controller 54 is programmed either with CAD data or by manually input data corresponding to a portion of a production part surface at a designated location. The controller 54 controls the X axis linear actuator 28, Y axis linear actuator 32, the Z axis linear actuator 38, the rotary drive 40, and the first and second arcuate motion actuators 46 and 50.

Figure 5:
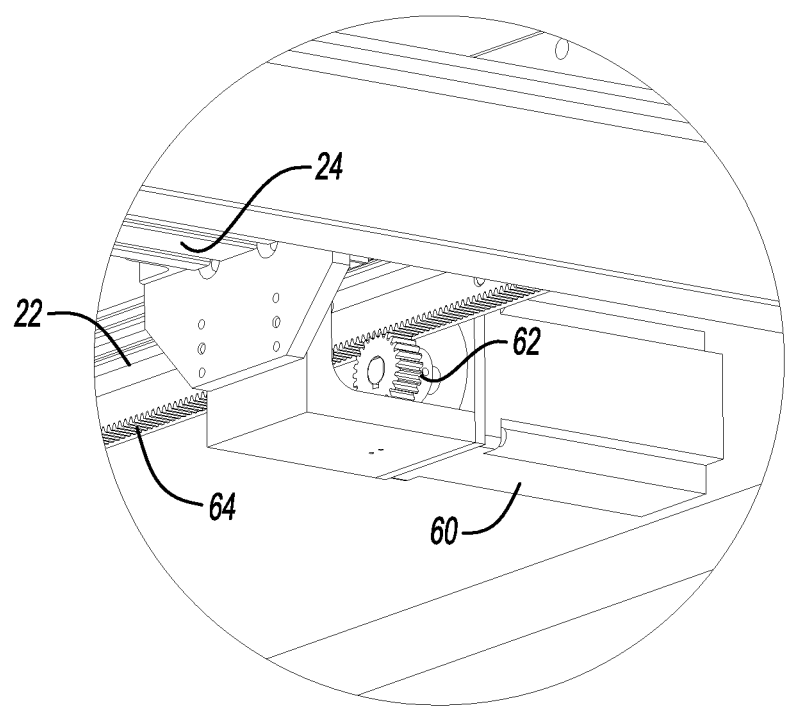
FIG. 5 is a fragmentary view of a stepper motor, pinion gear, and rack gear generally referred to as a linear actuator for positioning the FIG. 6 is a perspective view of the tool setting head.

Referring to FIG. 5, one example of a linear motion actuator (e.g. 28, 32) is shown to include a drive motor 60 (e.g. a stepper motor) that rotates a pinion gear 62. The pinion gear 62 traverses the rack gear 64 to drive the rail 24 along the tracks 22 or to drive the mast 30 along the rail 24. While the example given is a stepper motor, a servomotor could also be used to drive the rail 24 along the tracks 22 or drive the mast 30 along the rail 24. In another embodiment, the motor 60 could be a conventional electric motor and an encoder capable of accurately positioning the rail 24 and mast 30.

Figure 6:
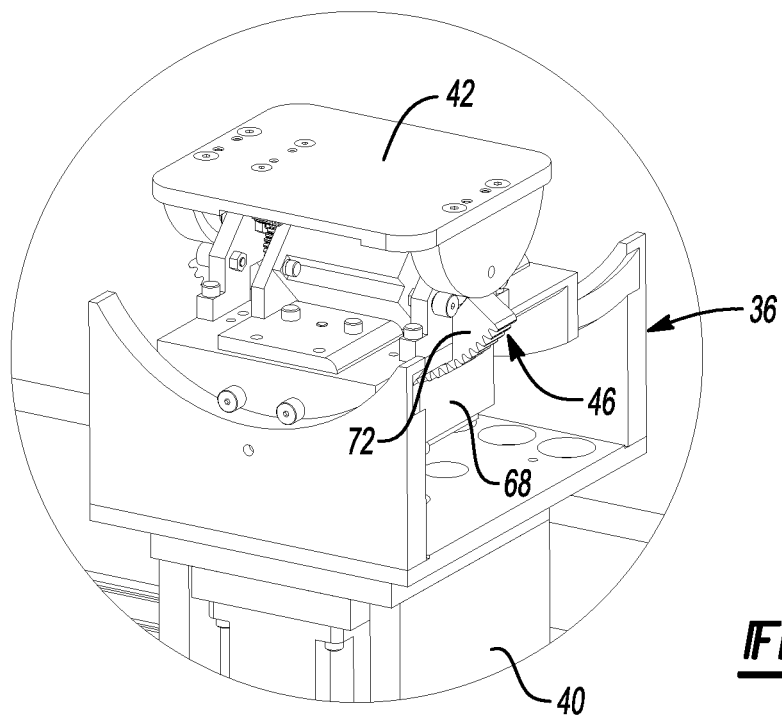
Figure 7:
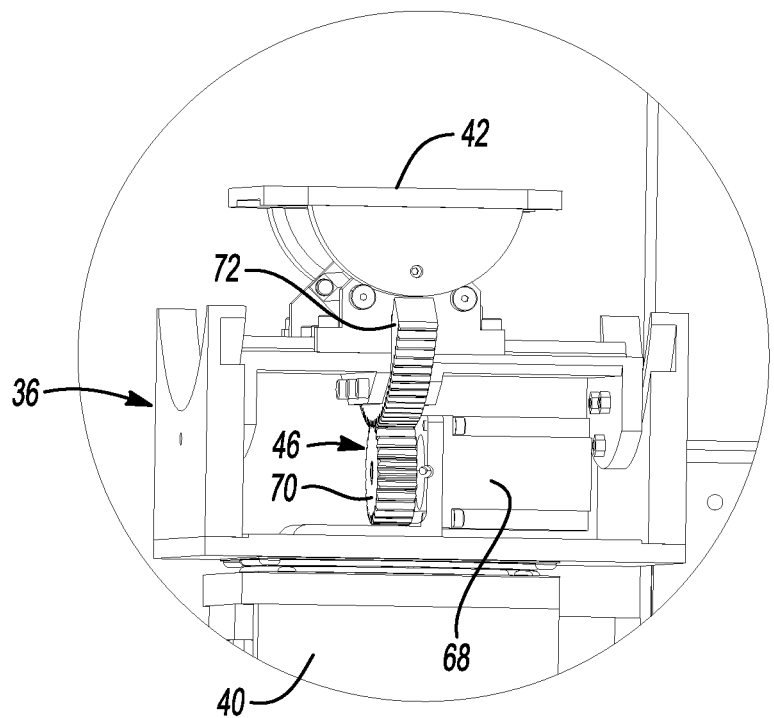
FIG. 7 is a perspective view of the tool setting head.
Figure 8:
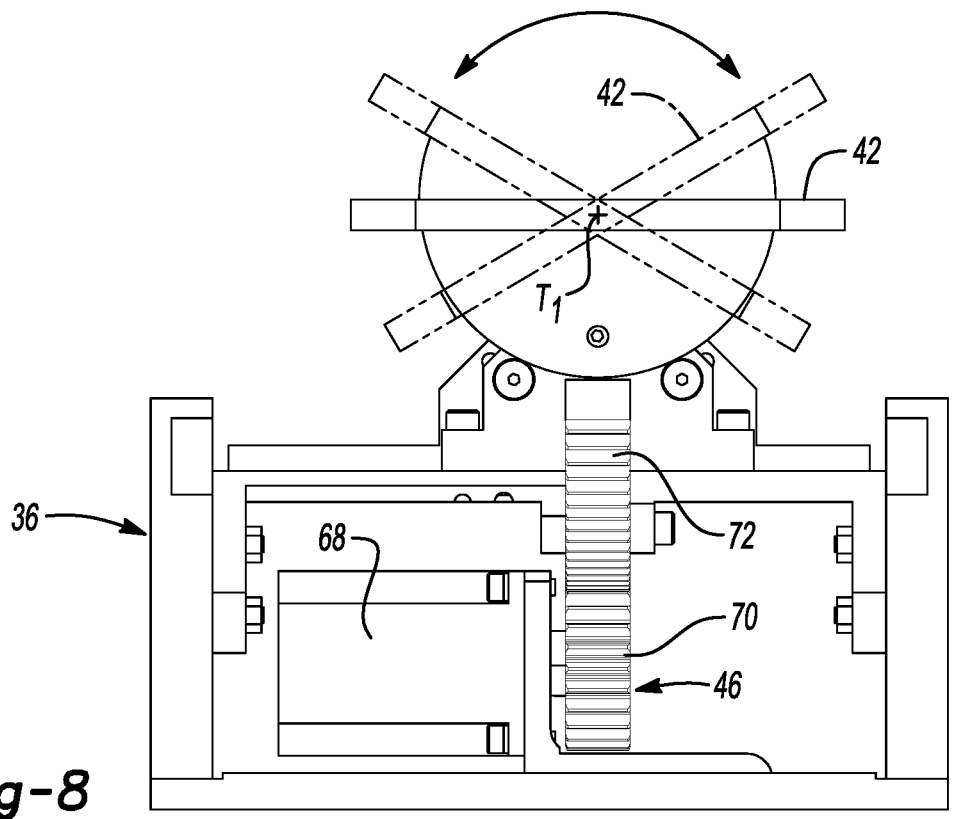
FIG. 8 is a side elevation view of the tool setting head.

Referring to FIGS. 6-8, the first arcuate motion actuator 46 is shown in greater detail. A drive motor 68 rotates a pinion gear 70 to pivot an arcuate gear 72. The first arcuate motion actuator 46 is operative to tilt the platen 42 about the second tilt axis $T_2$.

Figure 9:
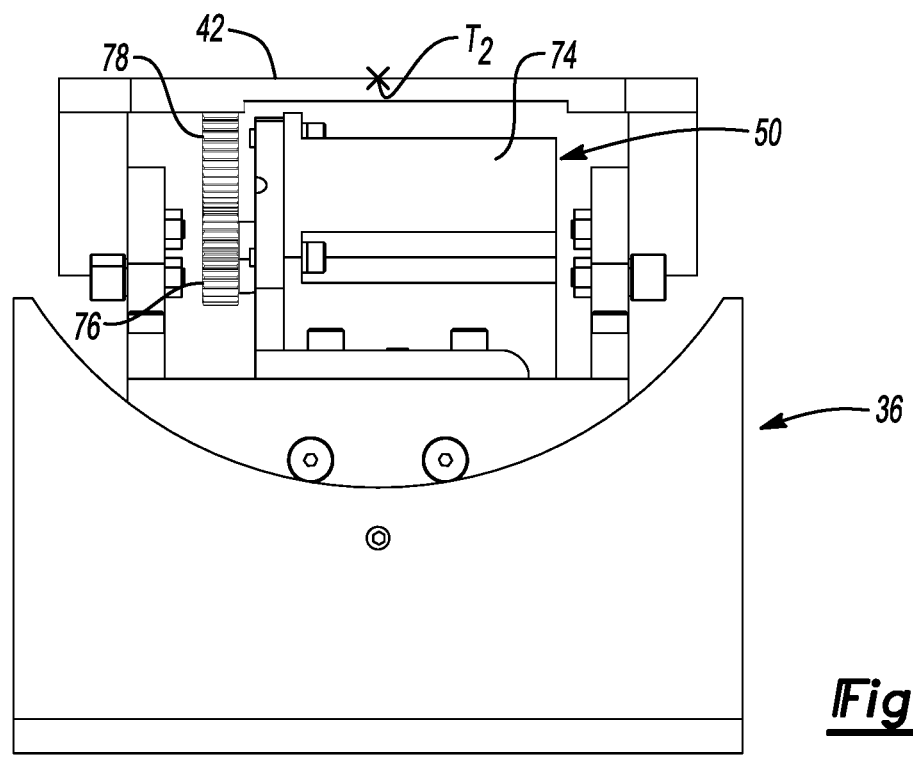
FIG. 9 is a front elevation view of the tool setting head in a centered position.
Figure 10:
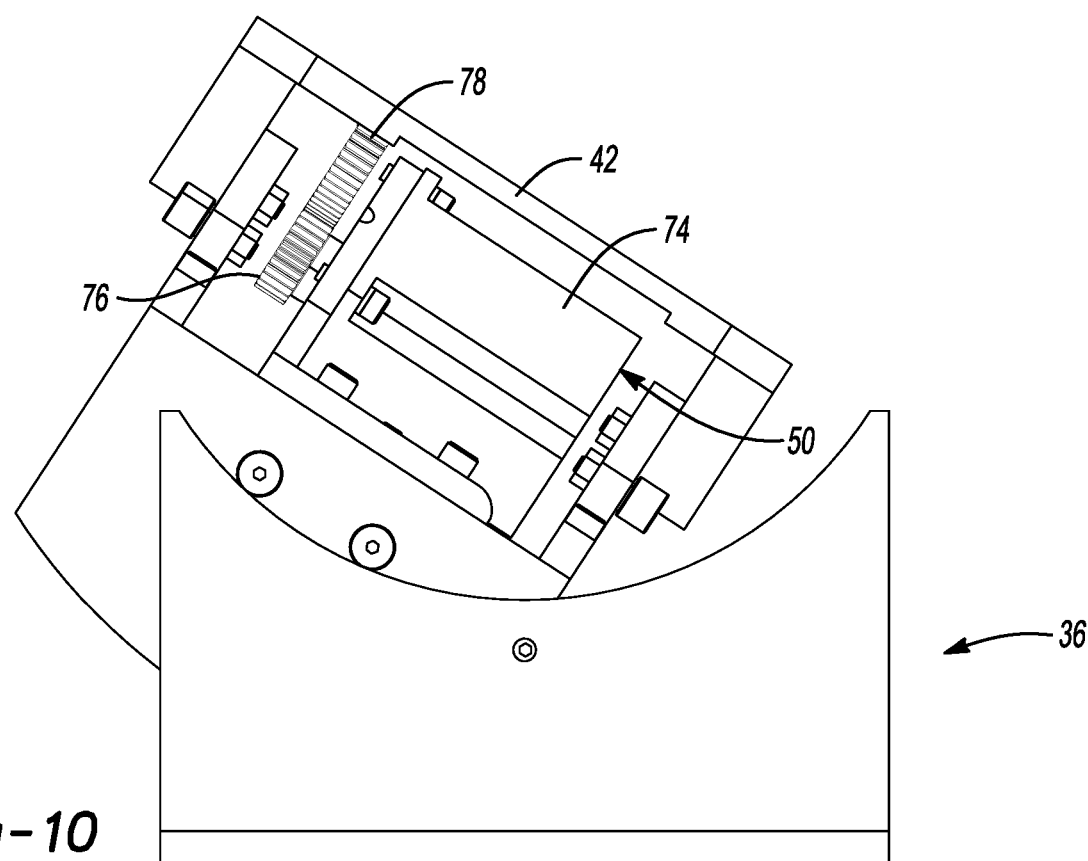
FIG. 10 is a front elevation view of the tool setting head in a position pivoted to the left side.
Figure 11:
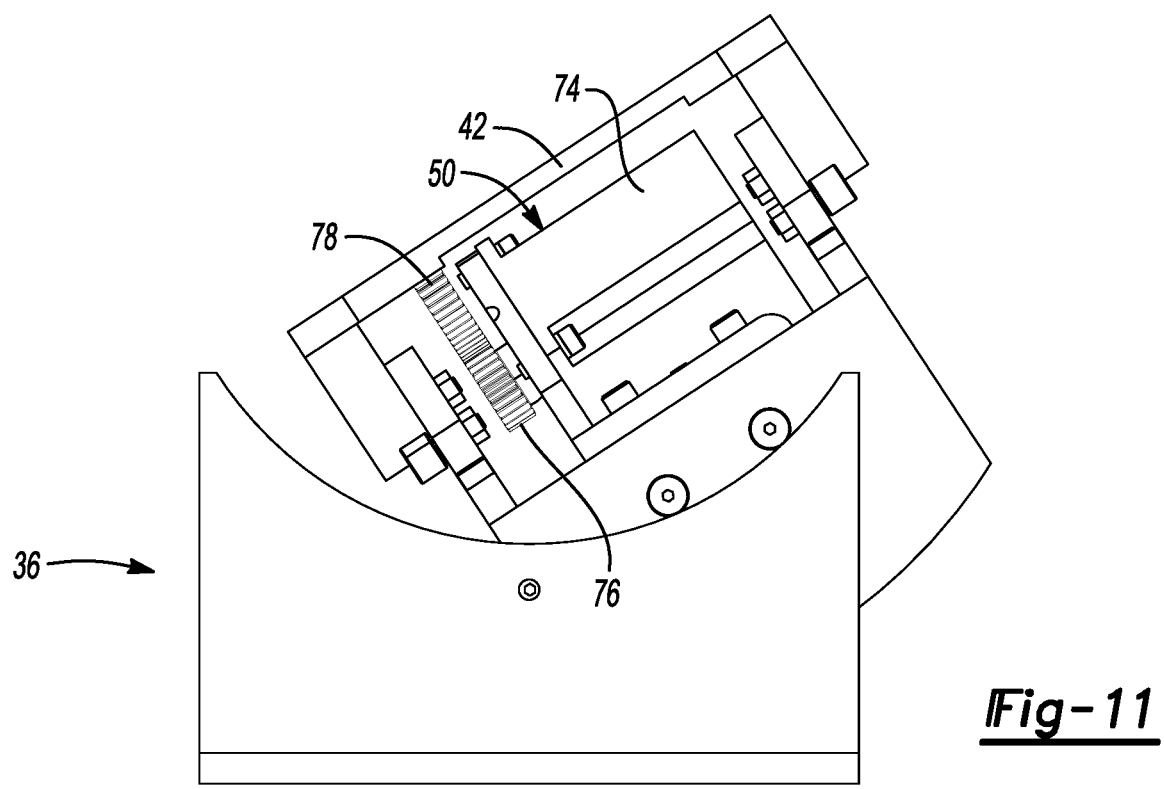
FIG. 11 is a front elevation view of the tool setting head in a position pivoted to the right side.

The tilting movement about the axis $T_2$ is shown in FIGS. 9-11. In FIG. 9, the platen 42 is not tilted and is in a centered orientation. In FIG. 10, the platen 42 is tilted toward the right side of the figure and the arcuate gear 72 is shifted to the left side of the view. In FIG. 11, the platen 42 is tilted toward the left side of the figure and the arcuate gear 72 is shifted to the right side of the view.

With continued reference to FIGS. 9-11, the second arcuate motion actuator 50 is shown that is operative to tilt the platen 42 about the first tilt axis $T_1$. A drive motor 74 rotates a pinion gear 76 that engages the arcuate gear 78. The tilting movement about the first tilt axis $T_1$ is shown in FIG. 8 by the arcuate arrow at the top of the figure. The solid lines illustrate the platen 24 in the neutral position and the phantom lines show the platen 24 being tilted about the first tilt axis $T_1$.

Figure 12:
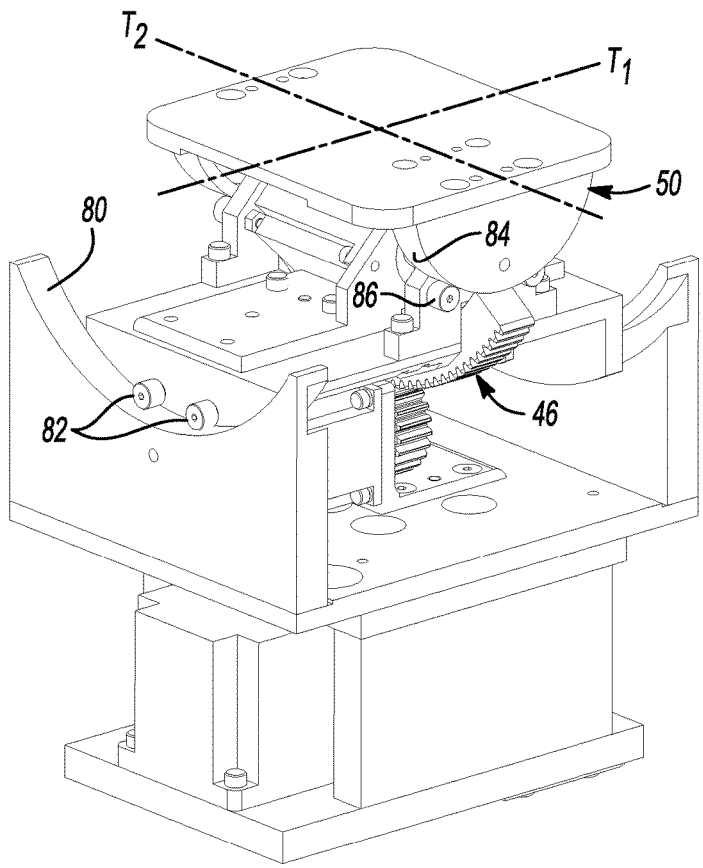
FIG. 12 is a perspective view of the tool setting head.

Referring to FIG. 12, the tool setting head is shown in perspective to illustrate the relationship of the first arcuate motion actuator 46 and the second arcuate motion linear actuator 50. Concave tracks 80 are engaged by two rollers 82 on opposite sides of the tool setting head 36 to assure a smooth tilting movement about the axis $T_1$. Convex tracks 84 ride on two rollers 86 on opposite sides of the tool setting head 36 to assure a smooth tilting movement about the axis $T_2$.

Figure 13:
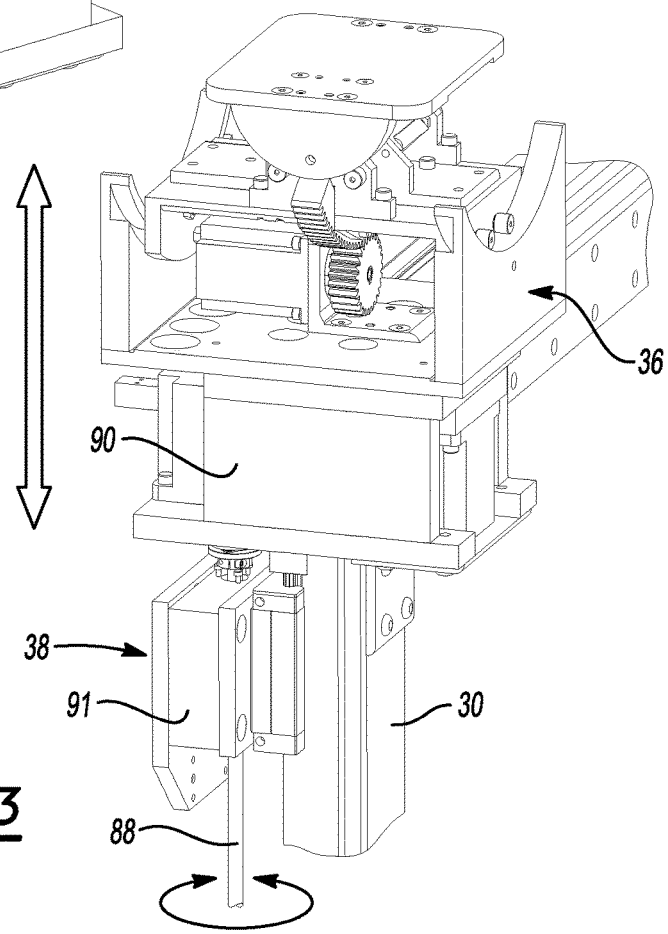
FIG. 13 is a perspective view of the tool setting head and a Z axis worm gear type of linear actuator.
Figure 14:
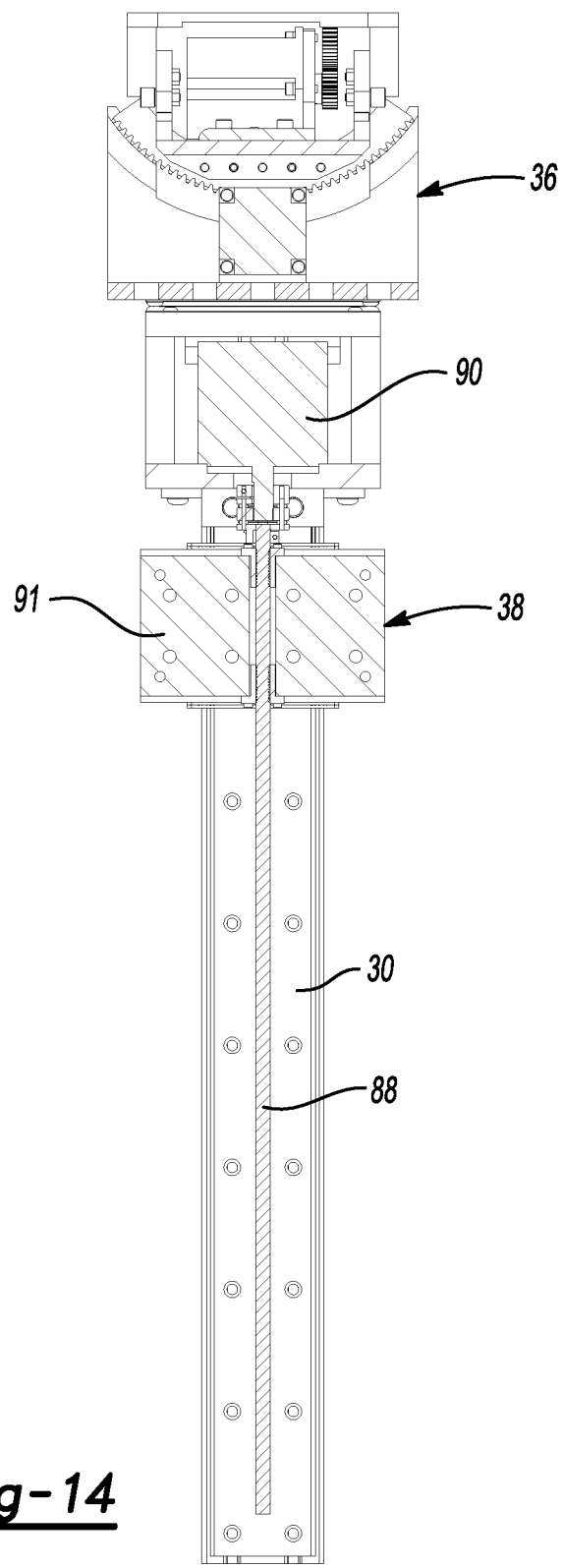
FIG. 14 is a diagrammatic cross-section view of the Z axis worm gear type linear actuator.

Referring to FIGS. 13 and 14, the Z axis linear actuator 38 is illustrated in greater detail. A worm gear 88 is rotated by a drive motor 90 within an internal worm gear 91 to raise and lower the mast 30. The worm gear 88 and internal worm gear 91 provide a robust lifting mechanism that resists deflection of the tool setting head 36 due to the weight of the tool setting head 36 and any loads applied to the tool setting head 36. A stepper motor and rack and pinion gear set as shown in FIG. 5 could be used instead of the worm gear drive as illustrated, if desired.

Figure 15:
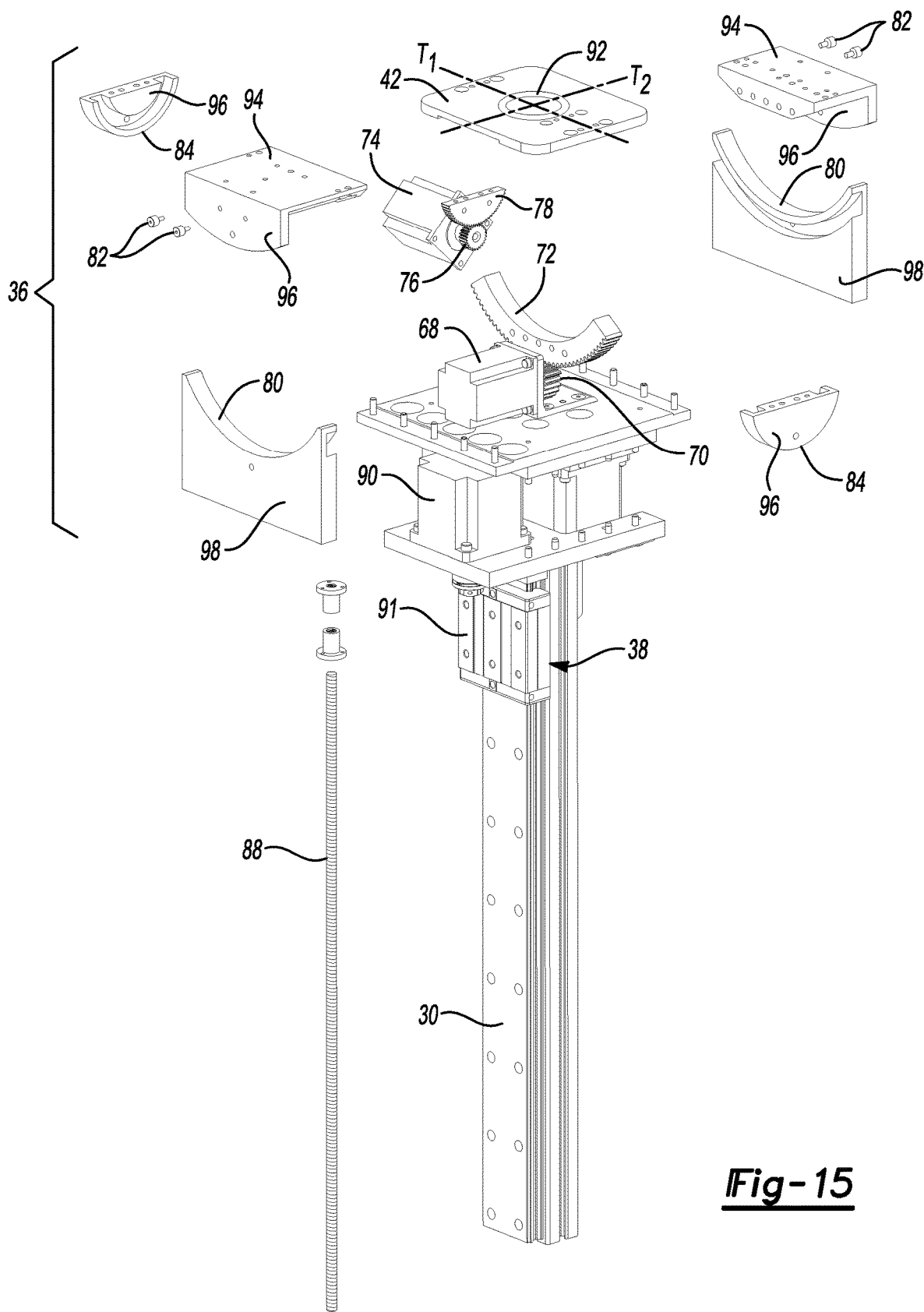
FIG. 15 is an exploded perspective view of selected parts of the tool setting head.

Referring to FIG. 15, the tool setting head 36 and Z axis linear actuator 38 are shown in an exploded perspective view with the drives shown but with some of the structural components eliminated to simplify the view. The platen 42 is marked with indicia 92 comprising a circular marking for locating a suction cup end effector. Other indicia may also be provided such as intersecting lines or other shapes the platen 42 is attached to a pair of mounting plates 94. A pair of arcuate members 96 that include the convex tracks 84 is attached to the mounting plates 94. The platen 42 and mounting plates 94 are tilted by the drive motor 74 rotating the pinion gear 76 that engages the arcuate gear 78 to tilt the platen about the axis $T_1$.

The platen 42 is also tilted about the tilt axis $T_2$ by actuating the drive motor 68 that rotates the pinion gear 70. The pinion gear engages the arcuate gear 72 to tilt the platen 42 about the axis $T_2$. Rollers 82 are attached to arcuate flanges 96 and ride on the concave tracks 80 provided on plates 98 that are assembled to opposite sides of the tool setting head 36.

The Z axis linear actuator 38 includes the worm gear 88 that is driven by the drive motor 90 to raise and lower the mast 30 by rotating the worm gear 88 inside the internal worm gear 91. The mast 30 is raising and lowered to position the tool setting head at the desired height on the Z axis.

The platen is located on the X, Y, and Z axes and the tool setting head 36 is oriented by the rotary drive 40 and the first and second arcuate motion actuators 46 and 50. With the platen 42 properly located, the end effector 100, shown in FIG. 1, is placed in alignment with the indicia 92 on the platen 42. The indicia 92 for a vacuum cup 100 is a circle as shown but for a sensor or gripper other indicia may be used. The vacuum cup 100 is secured in placed on the arm 102 that is attached to the adaptor bar 20 and a vacuum line 104 is also connect to a source of vacuum through the adaptor bar 20. If an electrical device is attached to the arm 102 electrical wiring may be attached via the adaptor bar 20 is stead of the vacuum line 104.

The adaptor bar retainer 18 is attached to the frame 12 and is configured to hold the adaptor bar 20 in a fixed location. The arm 102 is adapted to be installed on an automated modular tool and is assembled to the adaptor bar 18 when an end effector 100, such as a vacuum cup, is disposed on the platen. The arm 102 and vacuum cup 100 are then locked at a data defined location.

The adaptor bar retainer 18 is pivotably attached to the frame 12 and is adapted to be rotated on the frame 12 and selectively fixed in a plurality of fixed locations. A plurality of adaptor bars 20 are assembled to a plurality of sides of the adaptor bar retainer 18. Generally, four adaptor bars 20 are used to pick up parts at a loading or unloading production operation and all four adaptor bars 20 may be set up by rotating the adaptor bar retainer 18 in 90° rotation increments. At least one arm 102 of an automated modular tool is assembled to each of the adaptor bars 20. The adaptor bar retainer 18 is pivoted on the frame to set up each of the adaptor bars 20 for a selected station of the automated modular tool.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of assembling an automated modular tool comprising:
   programming a processor with data corresponding to a portion of a part surface at a designated location;
   providing a frame;
   driving a mast with a plurality of linear motion actuators to a selected three-dimensional location relative to an adaptor bar attached to the frame;
   rotating a tool setting head of the mast with a rotary drive;

pivoting a platen with at least one platen tilting motor and at least one gear set to angularly orient the platen to correspond to an orientation of the portion of the part surface at the designated location; and placing an end effector on the platen and securing the end effector to the adaptor bar with an arm.

2. The method of claim 1 wherein the step of driving the mast further comprises:

moving a rail in an X direction with an X axis linear actuator on a pair of spaced parallel tracks; and moving the mast in a Y direction with a Y axis linear actuator along a length of the rail to a selected X-Y location upon the data.

3. The method of claim 2 wherein the X axis linear actuator and Y axis linear actuator are both rack and pinion gear sets.

4. The method of claim 2 wherein the step of driving the mast further comprises:

moving the mast in a Z direction with a Z axis linear actuator to a selected Z location based upon the data.

5. The method of claim 4 wherein the Z axis linear actuator is a worm gear and a worm gear drive.

6. The method of claim 1 wherein the step of rotating the tool setting head further comprises:

rotating the tool setting head within a range of at least 180 degrees about a Z axis extending through the platen.

7. The method of claim 6 wherein the step of pivoting the platen is performed with the at least one platen tilting motor driving a first pinion gear and a first arcuate gear, and a second platen tilting motor driving a second pinion gear and a second arcuate gear oriented perpendicular to the first arcuate gear.

8. The method of claim 1 further comprising:

marking the platen with visible indicia corresponding to a shape of the end effector; and locating the end effector in alignment with the visible indicia.

\* \* \* \* \*